United States Patent [19]

Suzaka

[11] 4,334,783
[45] Jun. 15, 1982

[54] MIXING DEVICE

[75] Inventor: Yukinori Suzaka, Ooita, Japan

[73] Assignee: Showa Denko Kabushiki Kaisha, Tokyo, Japan

[21] Appl. No.: 104,100

[22] Filed: Dec. 17, 1979

[30] Foreign Application Priority Data

Dec. 21, 1978 [JP] Japan ................................ 53-156921
Oct. 26, 1979 [JP] Japan ................................ 54-137737

[51] Int. Cl.³ .......................... B28C 1/16; B01F 5/06
[52] U.S. Cl. .................................... 366/69; 366/341; 425/DIG. 49; 425/131.5
[58] Field of Search ................ 366/336, 337, 340, 69, 366/341, 150, 176; 425/131.5, 130, DIG. 49; 264/53, 50, 171, 45.3

[56] References Cited

U.S. PATENT DOCUMENTS

| | | | |
|---|---|---|---|
| 1,678,225 | 7/1928 | Kincade | 366/338 |
| 3,874,643 | 4/1975 | Lorenian | 366/338 |
| 4,087,862 | 5/1978 | Tsien | 366/340 |
| 4,124,309 | 11/1978 | Yao | 366/340 |

Primary Examiner—Robert W. Jenkins
Attorney, Agent, or Firm—McAulay, Fields, Fisher, Goldstein & Nissen

[57] ABSTRACT

A mixing device is presented which is suitable for use in the uniform mixing of polymer substances or the uniform mixing of polymer substances with, for example, fillers. This mixing device is composed of one mixing nozzle or two or more mixing nozzles mounted in parallel, which mixing nozzle comprises an orifice portion and an upstream compression zone and/or a downstream diffusion zone. A ratio of the maximum opening cross-sectional area of the compression zone or the diffusion zone to the minimum opening cross-section area of the orifice portion is 10:1 or more.

3 Claims, 13 Drawing Figures

MIXING DEVICE

The present invention relates to a mixing device suitable for use in the uniform mixing of polymer substances such as synthetic polymers or the uniform mixing of polymer substances with, for example, additives, such as fillers. The present invention also relates to an apparatus for producing fibrous materials having a high tenacity from molten thermoplastic polymers or polymer solutions by using said mixing device.

Recently, with the expansion of the various uses of polymer substances such as synthetic resins and also with the development of the processing techniques of polymer substances, there has been a strict requirement directed toward the high quality of polymer substances. In order to respond to this requirement, not only the development of the properties of a single polymer substance is required but, also, the mixing or blending of two or more polymer substances or a polymer substance or substances with inorganic or organic fillers is required. The mixing or blending has heretofore been carried out by using various mixing devices such as, for example, a single-screw extruder, a twin-screw extruder, or a Banbury mixer. However, these known mixing devices are still unsatisfactory for uniformly mixing many ingredients having extremely different molecular weights or viscosities. Although the repeated mixing by using the known conventional mixing devices gradually improves the uniformity or homogenity of the mixture or blend, this is not economical and, therefore, is not practical.

For instance, fibrous materials are generally produced by the melt spinning of thermoplastic polymer substances, such as polypropylene, polyethylene, polyamide and the like or by the wet spinning of solutions of, for example, copolymers of acrylonitrile and methyl acrylate, or polyvinyl alcohol and cellulosic polymers in appropriate solvents. The fibrous materials thus spun are then optionally drawn or stretched. However, since there has been considerable interest in recent years directed toward light-weight and low-cost products, the increase in the strength of fibrous materials is strongly desired.

Accordingly, the objects of the present invention are to obviate the aforementioned problems of the conventional mixing devices and to provide a mixing device for uniformly mixing polymer substances or a polymer substance or substances with, for example, fillers.

Another object of the present invention is to provide an apparatus for producing fibrous materials having a high tenacity.

Other objects and advantages of the present invention will be apparent from the following descriptions.

In accordance with the present invention, there is provided a mixing device of polymer substances including one mixing nozzle or two or more mixing nozzles mounted in parallel, said mixing nozzle comprising (i) an orifice portion and (ii) an upstream compression zone, a downstream diffusion zone or both zones, wherein a ratio of the maximum opening cross-sectional area of the compression zone or the diffusion zone to the minimum opening cross-sectional area of the orifice portion is at least 10:1. The minimum opening cross-sectional area of the orifice portion is not more than 20 mm$^2$, preferably not less than 10 mm$^2$ and, more preferably, between 0.001 and 3 mm$^2$.

In accordance with the present invention, there is also provided an apparatus for producing fibrous materials having a high tenacity comprising at least one mixing device mounted on the upstream side of spinning nozzles, said mixing device including one mixing nozzle or two or more mixing nozzles mounted in parallel, which nozzle comprises an orifice portion and an upstream compression zone, a downstream diffusion zone or both zones, wherein a ratio of the maximum opening cross-sectional area of the compression zone or the diffusion zone to the minimum opening cross-sectional area of the orifice portion is at least 10:1.

The present invention will now be better understood from the following description taken in connection with the accompanying drawings in which:

FIGS. 1-A, 1-B and 1-C are schematic drawings illustrating cross sections of various mixing nozzles of the present invention;

FIGS. 2-A and 2-B are schematic drawings partially illustrating a cross section of one example of the present apparatus for producing fibrous materials having a high tenacity and a side view thereof;

FIG. 3-A is a schematic drawing illustrating a cross section of a head portion of an extruder including the present mixing device which is used in the Examples.

FIGS. 3-B and 3-B' are schematic drawings illustrating a side view and a cross section of the present mixing device mounted in the head portion of the extruder shown in FIG. 3-A;

FIGS. 3-C and 3-C' are schematic drawings illustrating a side view and a cross section of another embodiment of the present mixing device mounted in the head portion of the extruder shown in FIG. 3-A;

FIGS. 5-A and 5-B are schematic drawings illustrating a cross section and a side view of a conventional spinning die used in a Comparative Example 7.

Figure 1A:
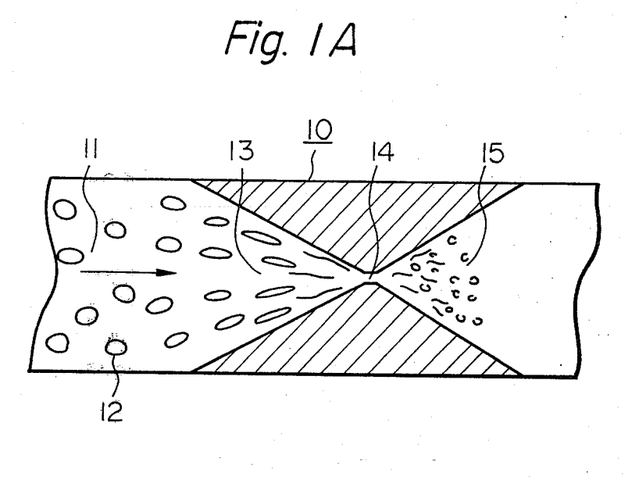

As shown in FIG. 1-A, a mixing nozzle 10 of the present invention comprises a compression zone 13, an orifice portion 14 and a diffusion zone 15. The mixing nozzle can be made of, for example, stainless steel, carbon steel and the like. FIG. 1-A schematically illustrates the mixing state of a high molecular weight component (or a high viscosity component) and a low molecular weight component (or a low viscosity component), of a synthetic resin in a molten state or solution in the mixing nozzle 10. In an introduction zone 11, the high viscosity component is present, as masses 12 like islands, in the sea of the low viscosity component due to the weak mixing condition. These masses 12 flow into the compression zone in a direction indicated by an arrow in FIG. 1-A, whereby the shapes of the masses 12 are elongated by the compression force derived from the gradual decrease in the cross-sectional area of the compression zone. The polymer substance is, then, passed through the orifice portion 14, whereby the polymer substance is drawn or stretched in the form of a thread. The polymer substance is finally diffused from the orifice portion 14 to the diffusion zone. Thus, the high viscosity component is completely mixed with the low viscosity component to form a uniform or homogeneous mixture.

Figure 1B:
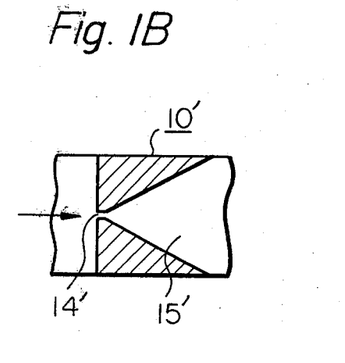
Figure 1C:
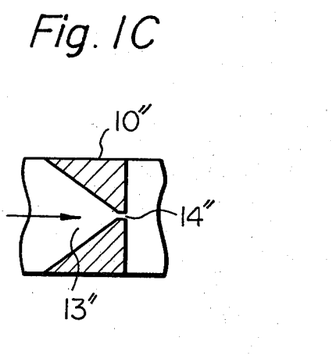

As shown in FIGS. 1-B and 1-C, a mixing nozzle 10' can be composed of an orifice portion 14' and a downstream diffusion zone 15' or a mixing nozzle 10'' can be composed of an upstream compression zone 13" and an orifice 14'''. These various mixing nozzles can be used, as a mixing device, alone or in any combination of the two or more nozzles. The mixing nozzles can be combined either in parallel or series. In order to obtain a good mixing effect, the presence of a compression zone in the mixing nozzle is preferable.

It should be noted that a ratio of the maximum opening cross-sectional area $S_1$ of the compression zone and/or the diffusion zone (i.e. the cross-sectional area of the inlet of the compression zone and/or the outlet of the diffusion zone) to the minimum opening cross-sectional area $S_2$ of the orifice portion, that is, a compression ratio of $S_1/S_2$, is an important factor in obtaining a good mixing effect. If the ratio $S_1/S_2$ is too small, the high viscosity component cannot be sufficiently elongated due to the fact that a good streamline of the polymer substance in a molten state or solution cannot be effected. As a result, the ratio $S_1/S_2$ is generally 10 or more, preferably 50 or more and, more preferably 100 or more. The mixing effect or the drawing effect increases as the ratio of $S_1/S_2$ increases. However, since the back pressure becomes high with the increase in the ratio $S_1/S_2$, it appears to us that, practically speaking, the maximum ratio $S_1/S_2$ is approximately 10,000.

The cross-sectional area of the orifice portion may be varied over a wide range. However, if the minimum opening cross-sectional area $S_2$ of the orifice portion is too large, the high viscosity component is not fully elongated. Contrary to this, if the minimum cross-sectional area $S_2$ is too small, it is likely that cloggings are liable to occur due to the presence of the fillers, dusts, foreign matters or the like and also it is likely that the back pressure will become unpreferably high. Therefore, the minimum opening cross-sectional area $S_2$ of the orifice portion is generally 20 mm$^2$ or less, preferably 10 mm$^2$ or less and, more preferably, between 0.001 and 3 mm$^2$. Although the length of the orifice land, can be substantially zero, it can be an appropriate length from the point of view of easy processing. Examples of typical land length is between zero and 2 mm. In a case where the land length of the orifice portion is too long, the back pressure increases, which is undesirable. The cross-sectional shape of the orifice portion as well as the compression and diffusion zone can be in any form such as, for example, circular, square, rectangular, annular ring form or the like.

The minimum cross-sectional area of the orifice portion not only forms the streamline of the high viscosity component when it flows from the introduction zone to the orifice portion directly or through the compression zone but, also, imparts a high shear rate to the materials to be mixed. In the case where a high shear rate is imparted to synthetic polymers in a molten state, it is known that a melt fracture phenomenon occurs to cause vigorous vibration. Due to the occurence of this phenomenon, the elongated thin high viscosity component is then finely divided when it leaves the orifice portion, whereby the high viscosity component is uniformly mixed with the low viscosity component. Even in the case where the elongated thin high viscosity component is not finely divided, the high viscosity component becomes in the form of an entangled state due to the vortex which occurs in the neighborhood of the outlet of the orifice portion. The entangled substances are released as the polymer substances flow through the diffusion zone and are, then, entangled with the low viscosity component to thereby form a uniform or homogeneous mixture. The main function of the diffusion is to reform the entangled state of the high viscosity component with the low viscosity component. The shear rate is preferably 50 sec$^{-1}$ or more.

The axial length of the compression zone can be varied over a wide range. However, if the axial length of the compression zone is too small, sufficient mixing cannot be effected since the high viscosity component is not fully elongated in the compression zone due to the shortage of the residence time of the high viscosity component in the compression zone. The preferable axial length of the compression zone is not less than $2\sqrt{S_2/\pi}$ mm.

The axial length of the diffusion zone can also be varied over a wide range. However, the axial length of the diffusion zone is preferably not less than $2\sqrt{S_2/\pi}$, so that the high viscosity component is reformed in an entangled state with the low viscosity component in the diffusion zone.

Two or more of the mixing nozzles having an orifice portion and a compression and/or diffusion zone can be combined, in parallel, when a large amount of the polymer substances is to be mixed. Two or more mixing nozzles can be formed in a plate. Furthermore, two or more of the mixing nozzles can be combined in series to obtain a more uniform mixture. However, since the pressure drop through the mixing device and the power cost increase with the increase in the number of the mixing nozzles combined in series, the number of mixing nozzles combined in series is preferably about 5 or less.

For instance, the present mixing device can be advantageously applied to the mixng of a product of high-density polyethylene or polypropylene, each produced in the form of a slurry. That is to say, these polymers are generally recovered from a reactor in the form of particles or powder, and after washing and drying, they are converted to the form of pellets in a finishing step. However, the particles or powder taken out of the reactor have a different molecular weight and crystallinity. Therefore, unless these particles or powder are uniformly mixed with each other, the properties or quality of the formed articles are adversely affected by the non-uniformity of the particles. For example, fish-eye or gel appears i a formed film or environmental stress cracking resistance (ESCR) appears in a formed bottle due to the above-mentioned non-uniformity of the particles. These phenomena also occur in low-density polyethylene produced by bulk polymerization and polystyrene produced by bead polymerization. The problems mentioned above can be effectively solved by uniformly mixing the particles or powder by using the present mixing device.

Furthermore, as the weight average molecular weight of synthetic resins increases, the properties, such as strength, of the synthetic resins is improved but fabrication or processing properties of the synthetic resins become worse. The poor fabrication properties of the synthetic resins having a high weight average molecular weight can be improved by widening the molecular-weight distribution without changing the weight-average molecular weight of the synthetic resins. For this purpose, many components having extremely different weight-average molecular weight can be uniformly mixed by using the present mixing device.

The mixing device of the present invention can be advantageously used for mixing a mixture in which a phase separation easily occurs due to the poor compatibility of of the components present in the mixture. For example, in the case where ethylene propylene rubber is blended to polypropylene in order to improve the cold-impact property of polypropylene, the ethylene propylene rubber is not compatible with the polypropylene and is generally dispersed in the polypropylene in a phase separated state. Although the addition of ethylene propylene rubber having a high molecular weight (i.e. a high viscosity) improves the cold-impact resistance of the polypropylene, the higher the molecular weight of the ethylene propylene rubber, the more difficult is the dispersion of the ethylene propylene rubber in the polypropylene in the conventional technique. However, the ethylene propylene rubber can be effectively and uniformly dispersed in the polypropylene by using the present invention.

Furthermore, the mixing device of the present invention can be advantageously used in the preparation of resin composite materials from a mixture having a poor compatibility. For example, in the case where a mixture containing low-density polyethylene and nylon-6,6 is passed through the present mixing nozzle at a temperature higher than a melting point of nylon-6,6, resin composite material containing an elongated thin nylon thread therein and having a high strength without losing the softness of the low-density polyethylene is obtained. However, it should be noted that, when the shear rate is too high, the strength of the composite material sometimes decreases due to the fact that the nylon thread is cut at the orifice portion.

In the case where synthetic resins are mixed with organic or inorganic fillers by using the present mixing device, uniform mixing can be effected due to the vibration, vortex and rotation actions at the orifice portion and the compression zone of the present mixing device. In the case where the present mixing device is used for uniformly dispersing pigments in polymer substances, the required amount of the pigments can be decreased in comparison with the conventional mixing device.

Figure 2A:
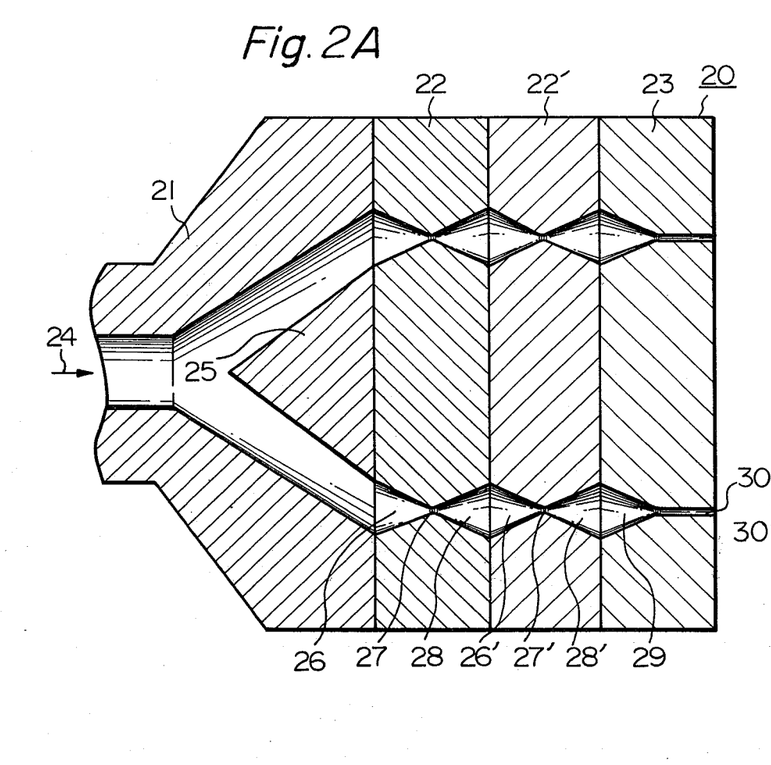
Figure 2B:
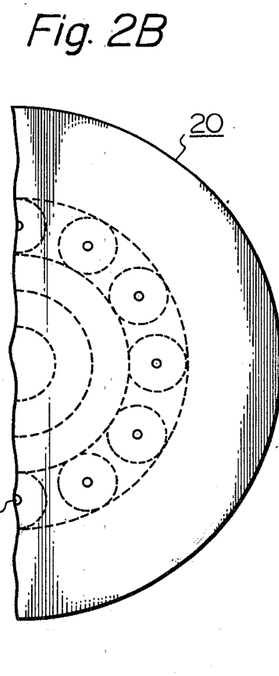

As shown in FIGS. 2-A and 2-B, an apparatus 20 for producing fibrous materials having a high tenacity comprises an adapter 21 which connects mixing devices 22 and 22' with an extruder (not shown), the two mixing devices 22 and 22' being combined in series, and a spinning die or a spinneret assembly 23. The mixing devices 22 and 22' have twelve mixing nozzles each containing a compression zone 26 or 26', an orifice portion 27 or 27' and a diffusion zone 28 or 28'.

A molten polymer substance 24 discharged from an extruder (not shown) is introduced, through an annular passage in the adapter 21, to the mixing devices 22 and 22'. The mixing devices 22 and 22' contain twelve mixing nozzles, of the design shown in FIG. 1-A, which are concentrically mounted in the mixing devices 22 and 22'. A topedo is represented in FIG. 2-A by a reference numeral 25. Although the mixing nozzle having the compression zone, the orifice portion and the diffusion zone is used in the embodiment shown in FIGS. 2-A and 2-B, it should be noted that a mixing nozzle having the orifice portion and the compression zone or the diffusion zone as shown in FIG. 1-B or 1-C can also be used in an apparatus for producing fibrous materials having a high tenacity. It should be noted that either only one mixing device or two or more mixing devices mounted in series can be used in the present apparatus.

As mentioned hereinbefore, the polymer substance discharged from the extruder is orientated, while the polymer substance is passed through the mixing device 22. This orientation of, expecially the high molecular-weight component prior to spinning, is very effective for obtaining fibrous materials having a high tenacity, since the strength of the fibrous material largely depends on the high molecular-weight component contained in the fibrous material. In the case where a further mixing device 22' is mounted, the elongated polymer substances which are interlocked with each other are further elongated in the interlocked state. This two-step elongation results in additional advantages, in comparison with the single-step elongation, in that the occurence of stretch failure in a post stretching step is remarkably decreased and in that the strength of the fibrous materials is further improved.

The polymer substance is then introduced into the spinning die 23, which contains compression introduction portions 29 and spinnerets 30. The compression indroduction portions 29 have the same function as the mixing devices 22 and 22'. The shape of the introduction portions 29 can be circular, polygonal or any other complicated form.

Although the cross-sectional shape of the spinnerets 30 in the spinning die 23 is generally a circular form, it can be any other form such as elliptical, polygonal or other complicated forms according to the desired cross-sectional shape of the fibrous materials to be spun. Although the mixing devices 22 and 22' and the spinning die 23 are directly combined with each other in the embodiment shown in FIG. 2-A, it should be noted that the present invention is by no means limited by this embodiment. For instance, a molten resin reservoir which commonly communicates with the resin passages mounted in the adjacent mixing device and the spinning die can be set between the mixing devices 22 and 22' or between the mixing device 22' and the spinning die 23. Alternatively, the compression zones or the diffusion zones of the mixing nozzles, or the compression introduction zone of the spinning die can be combined with each other to form a common resin reservoir in the form of, for example, a circular groove. In this case, the compression ratio $S_1/S_2$ can be determined from the maximum opening cross-sectional area $S_1$ of the groove and the minimum opening cross-sectional area $S_2$ of the orifice portion. The resin reservoir makes the pressure in the inlet of each die land uniform and, therefore, non-uniformity or irregularities of spun fibers can be advantageously obviated.

The polymer substances discharged from the spinning die 23 are generally passed through a cooling water bath or, if necessary, are solidified by using a treatment whereby base filaments are obtained. The base filaments are, directly or after winding up into a roll, stretched or drawn at an optimum temperature depending upon the kind of the polymer substance, the stretching operation can be conducted by any known conventional techniques, such as wet type, heating roll type, heating plate type and air heating bath type stretching. It is known that the strength of the fibrous materials is largely influenced by the stretching ratio. The present inventors have found that the stretchability of the fibrous materials produced by using the present apparatus remarkably increases. In the case where the base filaments are stretched in one-step, the stretchability of the base filaments is higher by approximately 1.5 to 2 times than that of conventional filaments, although it depends upon the kind of the polymer substance. Therefore, according to the present invention, the strength of the fibrous materials after stretching extremely increases and fibrous materials having a high tenacity, which is suitable for use in industrial applications, can be obtained. In addition, according to the present invention, not only the stretchability is improved but, also, the strength of the fibrous materials produced by using the present apparatus is surprisingly higher by 30 to 50% than the conventional fibrous materials, even in the same stretching ratio. Further, the elongation of the fibrous materials produced by using the present apparatus is also larger than the conventional fibrous materials. Accordingly, since, according to the present invention, straight strength and knot strength as well as straight strength and flexibility can be freely balanced as required, the present invention can be advantageously applied to industrial purposes.

In the case where fibrous materials having an extremely high tenacity are required, they can be subjected to a multi-stage stretching. In the case of crystallizable polymers, the degree of orientation generally increases and, therefore, the melting point increases as the stretching ratio is raised. However, if fibrous materials are stretched in a single-stage at a high stretching ratio, stretching failure frequently occurs due to the fact that the maintenance of the optimum stretching temperature is difficult. In order to obviate this problem, fibrous materials are generally stretched in a multi-stage process, while the stretching temperature is gradually raised. Since, according to this invention, the stretching ratio can be further increased in a multi-stage stretching process, fibrous materials having a higher tenacity can be obtained.

Although the present apparatus for producing fibrous materials having a high tenacity has been described with reference to the spinning of the molten thermoplastic resin, it is to be understood that the present apparatus can also be applied to wet spinning using a polymer solution.

The present invention now will be further illustrated by, but by no means limited to, the following Examples together with the Comparative Examples.

EXAMPLE 1 and COMPARATIVE EXAMPLE 1

Figure 3A:
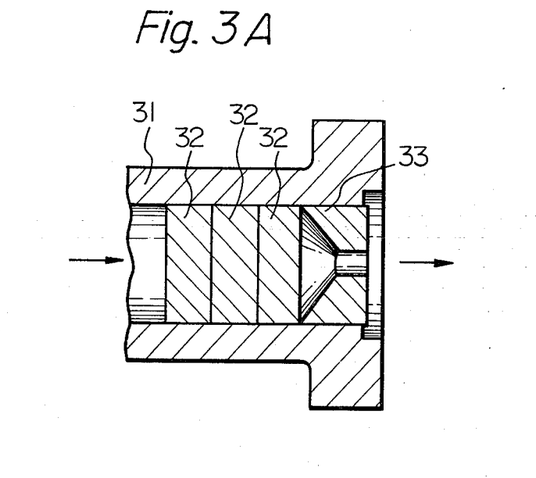
Figure 3B:
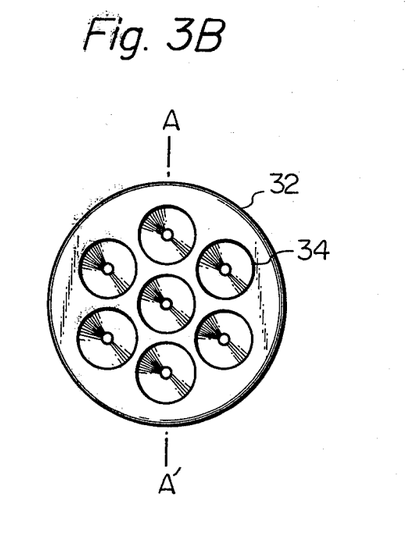

In a 50 mm$\phi$ head portion 31 of a 30 mm$\phi$ single-screw type extruder, three mixing devices 32 were mounted, in series, as shown in FIG. 3-A. The device 32 was a circular plate provided with 7 mixing nozzles 34 having the same dimensions as shown in FIG. 3-B and FIG. 3-B', FIG. 3-B' being a cross-sectional view of the mixing device 32 shown in FIG. 3-B, taken along the line A-A'. The center lines of the corresponding mixing nozzles 34 of the three mixing devices 32 coincide with each other. At the end portion 33 of the head 31, a die (not shown) was assembled.

The axial land length and the minimum cross-sectional area $S_2$, of each circular orifice portion of the mixing nozzle 34 were 0 mm and 0.196 mm$^2$, respectively. The and compression zone and the diffusion zone, both having a conical tapered shape, had a maximum opening cross-sectional area $S_1$ of 113 mm$^2$ and an axial length of 10 mm. The ratio $S_1/S_2$ was 577. $\sqrt{S_2/\pi}$ was 0.25 mm which was approximately one fortieth of the axial length of the compression or diffusion zone. The mixing devices 32 were made of SNCM 8 and the surface, to which the resin was contacted during the operation, was planished.

By using this extruder, 80 parts by weight of polypropylene having a melt-flow index of 18 g/10 min and 20 parts by weight of ethylene propylene rubber having an intrinsic viscosity of 4.5 (as measured in decaline at a temperature of 135° C.) were blended and pelletized. The shear rate at the orifice portion of the mixing nozzle was $4.3 \times 10^3$ sec$^{-1}$ and the extruder output was 1 kg/hr. The physical properties of the mixed resin were determined and are shown in Table 1 below.

As a compartive test, Example 1 was repeated in the same manner, except that three mixing devices 32 were not mounted in the head portion 31. As is clear from the results shown in Table 1, the brittle temperature and the elongation of the mixed resin of the present invention were remarkably improved.

TABLE 1

|  | Test Method | Example 1 | Comparative Example 1 |
| --- | --- | --- | --- |
| MFI (g/10 MIN) | ASTMD-1238 | 8.1 | 8.6 |
| Brittle Temperature (°C.) | ASTMD-746 | −26.5 | −8.0 |
| Bending Modulus (Kg/cm) | ASTMD-747 | 8850 | 8650 |
| Yield Strength (Kg/cm) | JIS*K-6758 | 224 | 226 |
| Elongation (%) | JIS K-6758 | 730 | 130 |

*Japanese Industrial Standards

EXAMPLES 2 through 4 and COMPARATIVE EXAMPLE 2

80 parts by weight of the polypropylene and 20 parts by weight of the ethylene propylene rubber, both used in Example 1, were blended at a temperature of 230° C. by using the extruder of Example 1, except that various mixing devices having different maximum cross-sectional areas $S_1$ of the compression zones and the diffusion zones, minimum cross-sectional areas $S_2$ of the orifice portions listed in Table 2 below were used. The ratios R of the axial lengths of the compression zone (or the diffusion zone) to $\sqrt{S_2/\pi}$ are also shown in Table 2 below. The number of the mixing devices mounted, in series, in the head portion 31 is also listed in Table 2 below. The extruder output was 1 kg/hr.

As is clear from the results shown in Table 2, the properties of the blended resin become better with the decrease in the area $S_2$, with the increase in the ratio $S_1/S_2$ and with the increase in the number of the mixing devices. Contrary to this, when the minimum cross-sectional area $S_2$ of the orifice portion was too large and when the ratio of $S_1/S_2$ was less than 10, effective mixing did not occur (please refer to Comparative Example 2).

EXAMPLES 5 and 6 and COMPARATIVE EXAMPLE 3

Figure 3C:
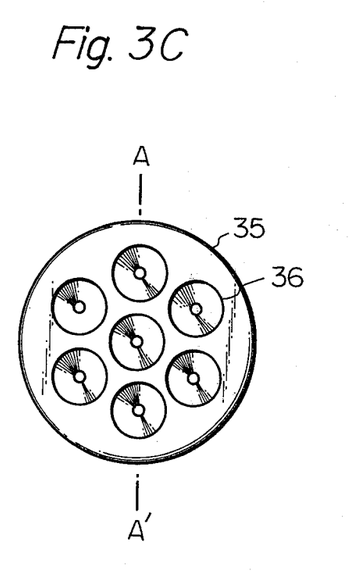

80 parts by weight of the polypropylene and 20 parts by weight of the ethylene propylene rubber, both used in Example 1 were blended at a temperature of 250° C. by using the extruder used in Example 1, except that a mixing device 35 shown in FIGS. 3-C and 3-C' provided with mixing nozzles having various dimensions listed in Table 2 below was used. FIG. 3-C' is a sectional view, taken along the line A-A', of FIG. 3-C. The dimensions of each of the mixing nozzles used in Examples 5 and 6 are identical to each other. In Example 5 and Comparative Example 3, the three mixing devices were mounted in the extruder head 31 in such a manner that the mixing nozzles have compression zones and orifice portions. On the other hand, the three mixing devices in Example 6 were mounted in the extruder head 31 in such a manner that the mixing nozzles have orifice portions and diffusion zones. That is, in Example 6, the mixing device 35 shown in FIG. 3-C' was mounted in the extruder head so that the molten resin discharged from the extruder flowed from the right hand side to the left hand side in FIG. 3-C'. The extruder output was 1 kg/hr.

The results are also shown in Table 2 below. As is clear from the results shown in Table 2, good physical properties were obtained in Examples 5 and 6. Contrary to this, the brittle temperature and the elongation, especially the elongation of the sample in Comparative Example 3 using the mixing nozzles having a high cross-sectional area $S_2$ of the orifice portion, were poor.

ESCR (Environmental Stress Cracking Resistance) listed in Table 3 is measured in a 10% solution of NON-ION NS210 (surface active agent available from Nichiyu Kagaku in Japan) at a temperature of 50° C. according to a method of ASTM D-1693.

As is clear from Table 3 below, both in Example 7 (three mixing devices) and Example 8 (one mixing device), excellent values of ESCR were obtained. Contrary to this, in Comparative Example 4 (no mixing device) and Comparative Example 5 (mixing device having a large $S_1$), ESCR was poor.

TABLE 3

| | $S_1(mm^2)$ | $S_2(mm^2)$ | Shear Rate $(sec^{-1})$ | Number of Mixing Device | R | M I (g/10min) A S T M D-1238 | Density (g/cm$^3$) J I S K-6760 | SR (%) | E S C R $F_{50}$(Hrs) A S T M D-1693 |
|---|---|---|---|---|---|---|---|---|---|
| Example 7 | 113 | 0.196 | $3.45 \times 10^3$ | 3 | 40 | 0.22 | 0.950 | 31 | 1250 |
| Example 8 | 113 | 0.196 | $3.45 \times 10^3$ | 1 | 40 | 0.25 | 0.951 | 29 | 1100 |
| Comparative Example 4 | — | — | — | — | — | 0.35 | 0.949 | 22 | 80 |
| Comparative Example 5 | 113 | 12.6 | 6.7 | 3 | 10 | 0.31 | 0.950 | 29 | 120 |

TABLE 2

| | $S_1(mm^2)$ | $S_2(mm^2)$ | Shear Rate $(sec^{-1})$ | Number of Mixing Device | R | M F I (g/10mm) A S T M D-1238 | Brittle Temperature (°C.) A S T M D-746 | Bending Modulus (Kg/cm$^3$) A S T M D-747 | Yield Strength (Kg/cm$^3$) J I S K-6758 | Elongation (%) J I S K-6758 |
|---|---|---|---|---|---|---|---|---|---|---|
| Example 2 | 113 | 0.196 | $4.31 \times 10^3$ | 1 | 40 | 8.4 | −20.1 | 8840 | 230 | 530 |
| Example 3 | 113 | 0.196 | $4.31 \times 10^3$ | 2 | 40 | 8.3 | −26.0 | 8750 | 650 | |
| Example 4 | 113 | 0.785 | $4.72 \times 10^3$ | 3 | 20 | 8.3 | −18.0 | 8755 | 228 | 480 |
| Comparative Example 2 | 113 | 19.6 | 4.31 | 3 | 1 | 8.6 | −8.5 | 8866 | 230 | 150 |
| Example 5 | 113 | 0.196 | $4.31 \times 10^3$ | 3 | 80 | 8.4 | −21.1 | 8760 | 226 | 680 |
| Example 6 | 113 | 0.196 | $4.31 \times 10^3$ | 3 | 80 | 8.6 | −18.5 | 8855 | 230 | 620 |
| Comparative Example 3 | 113 | 12.6 | 8.42 | 3 | 10 | 8.6 | −10.0 | 8765 | 224 | 80 |

EXAMPLES 7 and 8 and COMPARATIVE EXAMPLE 4 and 5

25 parts by weight of an ethylene-butene copolymer having a density of 0.915 g/cc and a high-load melt index of 0.11 g/10 min (ASTM D-1238, 21.6 kg load) and 75 parts by weight of high-density polyethylene having a density of 0.962 g/cc and a melt index of 8.2 g/10 min were blended at a temperature of 220° C. and at an extruder output of 1 kg/hr by using an extruder provided with a mixing device or devices as shown in FIGS. 3-A, 3-B and 3-B'. The maximum opening cross-sectional area $S_1$ of the compression and diffusion zone, the minimum opening cross-sectional area $S_2$ of the orifice portion, the shear rate, the number of the mixing devices and the ratio R of the axial lengths of the compression zone (or the diffusion zone) to $\sqrt{S_2/\pi}$ are listed in Table 3 below.

The results of the physical properties of the blended resin are also shown in Table 3 below.

SR (Swelling Ratio) listed in Table 3 is represented as follows.

SR = (D/D$_0$ − 1) × 100 wherein D is the diameter of the extruded resin when the melt index is measured and D$_0$ is the diameter of the die.

EXAMPLE 9 and COMPARATIVE EXAMPLE 6

Figure 4:
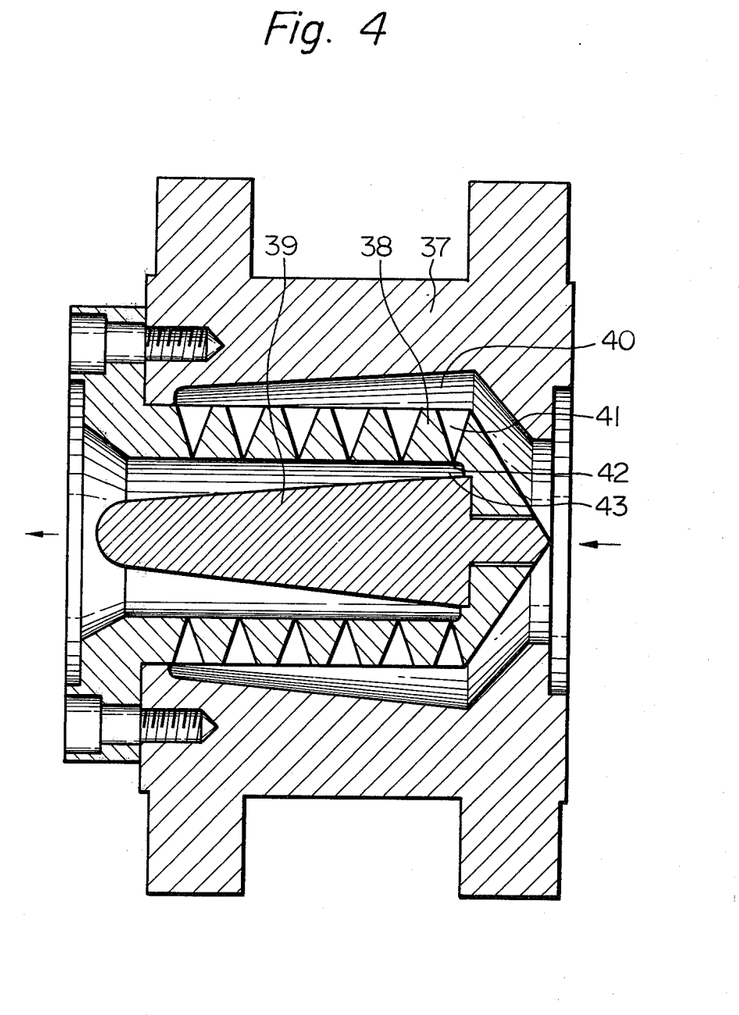
FIG. 4 is a schematic drawing illustrating a cross section of the present mixing nozzle mounted, together with a mandrel, in a head portion of an extruder used in Example 9.

By using a 65 mm$\phi$ single-screw type extruder having a head portion 37 provided with a mixing device 38 as shown in FIG. 4, 25 parts by weight of the ethylene-butene copolymer and 75 parts by weight of the high-density polyethylene both used in Example 7 were blended at a temperature of 250° C. and at an extruder output of 70 kg/hr.

The mixing device 38 was connected to a mandrel 39, in series, and had 275 mixing nozzles each having the same shape and dimensions. Each of the mixing nozzles 38 comprises a common introduction portion 40, a compression zone 41, an orifice portion 42 and a common diffusion zone 43. The cross-section of the orifice was circular and the land length thereof was zero. The minimum cross-sectional area $S_2$ of the orifice portions was 0.785 mm$^2$. The compression zones 41 each had conical tapered shape having the maximum opening cross-sectional areas $S_1$ of 78.5 mm$^2$. The compression ratio $S_1/S_2$ was 100. The axial length of the compression zone was 15 mm. The ratio R of this axial length to $\sqrt{S_2/\pi}$ was 30.

The results are shown in Table 4 below. As is clear from Table 4, excellent ESCR was obtained in Example 9, whereas ESCR of the sample in Comparative Example 6 (no mixing device) was poor.

TABLE 4

| | $S_1(mm^2)$ | $S_2(mm^2)$ | Shear Rate (sec$^{-1}$) | Number of Mixing Device | R | M I (g/10min) A S T M D-1238 | Density (g/cm$^3$) J I S K-6760 | SR (%) | E S C R F$_{50}$(Hrs) A S T M D-1693 |
|---|---|---|---|---|---|---|---|---|---|
| Example 9 | 78.5 | 0.785 | 9.6 × 10$^2$ | 1 | 30 | 0.23 | 0.951 | 31 | 1150 |
| Comparative Example 6 | — | — | — | — | — | 0.32 | 0.950 | 23 | 300 |

EXAMPLE 10

By using a 40 mm$\phi$ extruder provided with an apparatus 20 for producing fibrous materials having a high tenacity as shown in FIGS. 2-A and 2-B through an appropriate adapter, SHOLEX MX 0438 (high-density polyethylene having a melt index of 0.42 and a density of 0.952 available from Showa Denko Co.) was spun.

The apparatus 20 was assembled in such a manner that the resin was downwardly extruded from the apparatus 20. The two mixing devices 22 and 22' were the same, each having twelve mixing nozzles having the same dimensions mounted, in parallel, in a circular plate. The diameter of the circular inlet of each compression zone 26, 26' and the circular outlet of each diffusion zone 28, 28' was 15 mm and the axial length of each compression zone 26, 26' and each diffusion zone 28, 28' was 15 mm. The diameter of each orifice portion 27, 27' was 1 mm and the land length thereof was 1 mm.

The shape and the dimensions of the introduction portions 29 of the spinning die 23 were the same as those of the compression zones 26, 26' of the mixing devices 22, 22'. The diameter and the land length, of the circular spinneret 30, were 1.6 mm and 16 mm, respectively.

The maximum opening cross-sectional area $S_1$ of each compression zone 26, 26' and each diffusion zone 28, 28' was 176.7 mm$^2$ and the minimum opening cross-sectional area $S_2$ of each orifice portion 27, 27' was 0.78 mm$^2$. Thus, the ratio of $S_1$ to $S_2$ was 225:1.

SHOLEX MX 0438 was spun at a temperature of 280° C. by using said apparatus. The molten resin discharged from the spinneret 30 was immediately passed through a cold water bath at a temperature of 30° C. and, then, stretched at a stretching ratio of 2.5. After winding up the base filaments into a roll, the base filaments were stretched in a wet stretching bath at a constant temperature of 100° C. at various stretching ratios listed in Table 5. The results are shown in Table 5.

COMPARATIVE EXAMPLE 7

Figure 5A:
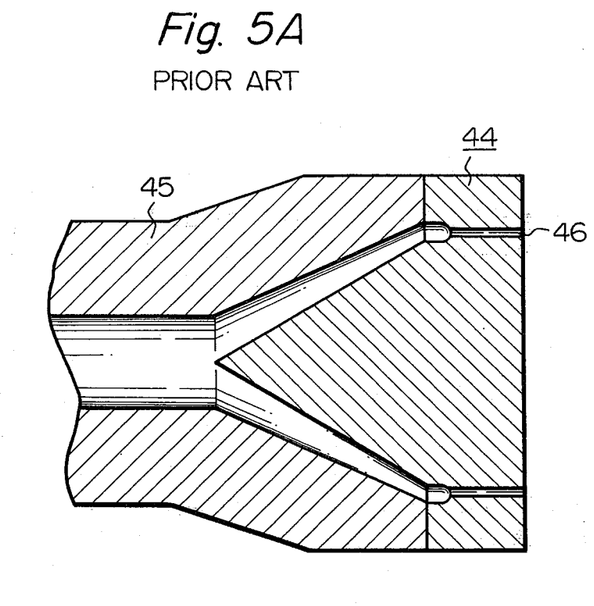
Figure 5B:
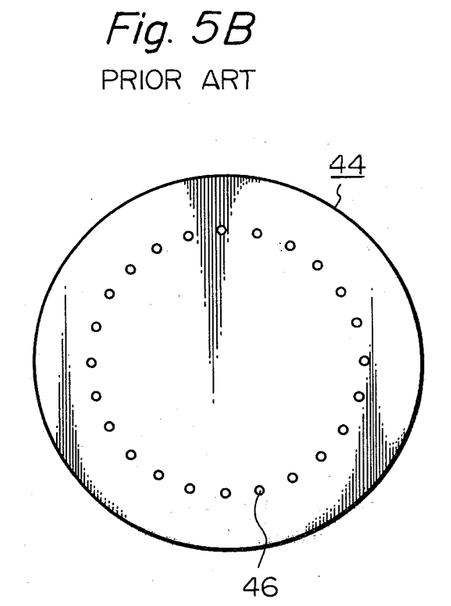

By using a conventional spinning die 44 provided with a resin introduction portion 45 and twenty-four spinnerets 46 as shown in FIGS. 5-A and 5-B, SHOLEX MX 0438 was spun in a manner as described in Example 10. The diameter of the circular spinnerets 46 was 1.6 mm and the land length thereof was 16 mm.

This spinning die 44 was attached to the 40 mm$\phi$ extruder used in Example 10. The resin was spun at a temperature of 280° C. and, then, cooled through a cold water bath at a temperature of 30° C. The base filaments were wound up into a roll at a drafting ratio of 2.5. The filaments were then stretched, at various stretching ratio shown in Table 5 below, in a wet type stretching bath at a temperature of 100° C. to produce monofilaments. The results are shown in Table 5 below.

TABLE 5

| | Stretching Ratio | Straight strength (g/d) | Straight Elongation (%) | Knot Strength (g/d) | Remarks |
|---|---|---|---|---|---|
| Example 10 | 8 | 7.5 | 26 | 6.1 | |
| | 10 | 9.6 | 18 | 6.0 | |
| | 12 | 10.8 | 13 | 4.8 | |
| | 14 | 12.0 | 11 | 3.7 | |
| | 16 | 13.5 | 10 | 4.1 | |
| | 18 | 14.9 | 8 | 3.5 | |
| Comparative Example 7 | 8 | 6.0 | 18 | 5.0 | |
| | 10 | 8.0 | 14 | 5.5 | |
| | 12 | 9.5 | 12 | 4.5 | Frequent Stretch Failure |

(Remarks) The strengths were determined according to JIS L 1073
(Chuck distance 300 mm, Cross head speed 300 mm/min at 20° C.)

As is clear from Table 5, the straight strength of present monofilament of Example 10 is higher by approximately 20% than that of Comparative Example 7 at the same stretching ratio. In addition, the straight elongation of the monofilament of Example 10 is higher than that of Comparative Example 7 despite the fact that the strength of the present monofilament of Example 10 is higher than these of Comparative Example 7. This phenomenon is new and indicates the uniqueness of the present invention. In Comparative Example 7, frequent stretching failure has occurred at a stretching ratio of 12, whereas the stretching could be satisfactorily effected even at a stretching ratio of 18 in Example 10. Thus, an excellent stretchability can be obtained in accordance with the present invention. In addition, the straight strength increases as the stretching ratio is raised. In the case of a stretching ratio of 18, the straight strength becomes as much as 14.9 g/d. This is a very high value which has not been obtained with respect to the monofilament of polyethylene.

EXAMPLES 11 and 12

The resin used in Example 10 was spun at a temperature of 280° C. by using the apparatus used in Example 10. The spun filaments were subjected to a multi-stage stretching as shown in Table 6. The first stretching was conducted in a hot water bath having a temperature of 100° C. (wet type stretching) and the second and third stretchings were conducted by using a hot roller. As shown in Table 6 below, monofilaments having a high tenacity were obtained.

TABLE 6

| | Example 11 | Example 12 |
|---|---|---|
| First Stretching Temperature (°C.) | 100 | 100 |
| First Stretching Ratio | 15 | 16 |

TABLE 6-continued

|  | Example 11 | Example 12 |
|---|---|---|
| Second Stretching Temperature (°C.) | 115 | 115 |
| Second Stretching Ratio | 1.25 | 1.25 |
| Third Stretching Temperature (°C.) | 120 | 120 |
| Third Stretching Ratio | 1.25 | 1.25 |
| Total Stretching Ratio | 23.4 | 25 |
| Straight Strength (g/d) | 18.1 | 19.5 |
| Straight Elongation (%) | 6.2 | 5.5 |
| Knot Strength (g/d) | 2.8 | 2.5 |

What we claim is:

1. A mixing device suitable for use in the uniform mixing of polymer substances in a molten state, said mixing device including at least one mixing nozzle comprising (i) an orifice portion and (ii) at least one zone selected from an upstream compression zone and a downstream diffusion zone, wherein
the ratio of the maximum opening cross-sectional area of said zone to the minimum opening cross-sectional area of the orifice portion is 100 or more; and the axial length of said zone is not less than $2\sqrt{S_2/\pi}$ mm, wherein $S_2$ is the minimum opening cross-sectional area of said orifice portion.

2. A mixing device as claimed in claim 1, wherein the minimum opening cross-sectional area of the orifice portion is not more than 20 mm$^2$.

3. A mixing device according to claim 1 which is mounted in the head portion of an extruder.

* * * * *